United States Patent
Schnaedelbach et al.

(10) Patent No.: US 9,803,717 B2
(45) Date of Patent: Oct. 31, 2017

(54) CENTRIFUGAL-FORCE PENDULUM DEVICE

(71) Applicant: Schaeffler Technologies AG & Co. KG, Herzogenaurach (DE)

(72) Inventors: David Schnaedelbach, Baden-Baden-Neuweier (DE); Florian Baral, Waldbronn (DE); Tobias Schuster, Esslingen (DE); Bernhard Ziegler, Rechberghausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/718,684

(22) Filed: May 21, 2015

(65) Prior Publication Data

US 2015/0252872 A1 Sep. 10, 2015

Related U.S. Application Data

(63) Continuation-in-part of application No. 13/924,289, filed on Jun. 21, 2013, now abandoned, which is a continuation of application No. PCT/DE2011/002145, filed on Dec. 20, 2011.

(30) Foreign Application Priority Data

Dec. 23, 2010 (DE) .................. 10 2010 055 895

(51) Int. Cl.
  *F16F 15/14* (2006.01)
  *F16F 15/12* (2006.01)
(52) U.S. Cl.
  CPC ........ *F16F 15/145* (2013.01); *F16F 15/1202* (2013.01); *Y10T 74/2128* (2015.01)
(58) Field of Classification Search
  CPC .................... F16F 15/145; F16F 15/1202
  See application file for complete search history.

(56) References Cited

U.S. PATENT DOCUMENTS

| 8,800,731 B2 * | 8/2014 | Engelmann | F16F 15/145 188/290 |
| 2002/0078791 A1 * | 6/2002 | Eckel | F16F 15/145 74/574.4 |
| 2010/0236228 A1 * | 9/2010 | Degler | F16F 15/145 60/338 |

FOREIGN PATENT DOCUMENTS

| DE | 102006028556 A1 * | 1/2007 | ............ F16F 15/145 |
| DE | 102013208430 A1 * | 11/2013 | ............ F16F 15/145 |

OTHER PUBLICATIONS

Translation of DE102013208430.*

* cited by examiner

*Primary Examiner* — Vicky Johnson
(74) *Attorney, Agent, or Firm* — Simpson & Simpson, PLLC

(57) ABSTRACT

A centrifugal-force pendulum device having a pendulum flange and at least two pendulum masses fastened on both sides of the pendulum flange by means of a spacer bolt received in a cut-out of the pendulum flange to form a pendulum mass pair, wherein the pendulum mass pair is guided and pivoted in a limited manner with respect to the pendulum flange by means of at least two rolling elements, and the rolling elements are received and roll in guide tracks in the pendulum masses and in complementarily shaped guide tracks in the pendulum flange, and wherein the spacer bolt is equipped, in its axial region which reaches through the cut-out in the pendulum flange, with damping means for damping contact of the spacer bolt against the cut-out, and compression of the damping means is limited by contact of a rolling element against the guide track which receives the rolling element.

10 Claims, 3 Drawing Sheets

CENTRIFUGAL-FORCE PENDULUM DEVICE

CROSS-REFERENCE TO RELATED APPLICATIONS

This application is filed under 35 U.S.C. §120 as a continuation-in-part of U.S. patent application Ser. No. 13/924,289, filed Jun. 21, 2013, which application is a continuation of International Patent Application PCT/DE2011/002145, filed Dec. 20, 2011, which application claims priority from German Patent Application No. DE 10 2010 055 895.8, filed Dec. 23, 2010, which applications are incorporated herein by reference in their entirety.

FIELD OF THE INVENTION

A centrifugal pendulum device is known from application DE 10 2010 011 141.4, having a pendulum flange which can rotate about an axis of rotation, and having two pendulum masses which are attached to create a pendulum mass pair, the same arranged on both sides of the pendulum flange in the axial dimension by means of a spacer bolt accommodated in a recess of the pendulum flange. The pendulum mass pair is further able to pivot in a guided and limited manner with respect to the pendulum flange by means of two roller elements, forming a pendulum track. For this purpose, the roller elements are accommodated in curved, and particularly kidney-shaped tracks in the pendulum masses, and in the complementary-shaped guide tracks in the pendulum flange, and can roll in the same. In an axial region of the spacer bolt, which engages through the recess in the pendulum flange, said spacer bolt is surrounded by a damping means in the form of a damping sheath, for the purpose of damping the impact of the spacer bolt on the recess. The damping of the impact is realized by the damping means compressing a spring, and thereby forming a spring compression path. In this case, when a greater load occurs, meaning a large relative impulse in the pendulum masses and/or the pendulum mass pair relative to the pendulum flange, an excessively high load can occur on the damping means.

BACKGROUND OF THE INVENTION

The problem addressed by the invention is that of increasing the reliability of a centrifugal pendulum device, and reducing the generation of noise.

Accordingly, a centrifugal pendulum device is suggested which has a pendulum flange and which has at least two pendulum masses which are attached on each side of the pendulum flange by means of a spacer bolt accommodated in a recess of the pendulum flange to create a pendulum mass pair, wherein the pendulum mass pair is able to pivot relative to the pendulum flange in a guided and limited manner by means of at least two roller elements, and the roller elements are accommodated in guide tracks in the pendulum masses, and in complementary-shaped guide tracks in the pendulum flange, and can roll in the same, and wherein the spacer bolt, on an axial region thereof, which engages through the recess in the pendulum flange, is equipped with a damping means for the purpose of damping the impact of the spacer bolt on the recess. A spring compression of the damping means can be limited by a roller element impacting on the guide track which accommodates the roller element, thereby increasing the reliability of the centrifugal pendulum device, particularly of the damping means on the spacer bolt.

BRIEF SUMMARY OF THE INVENTION

In one preferred embodiment of the invention, the damping means is compressed when the roller element impacts on the guide track. A maximum compression of the damping means is advantageously limited by the impacting of the roller element on the guide track.

In a further embodiment of the invention, the damping means encloses the spacer bolt, forming a damping sheath.

In one advantageous embodiment of the invention, the damping means is formed from an elastic material, wherein the elastic material can be an elastomer and/or a plastic and/or a rubber and/or a composite material.

The damping means is advantageously connected to the spacer bolt in a material connection or a positive-fit connection.

In a further preferred embodiment of the invention, at least two pendulum mass pairs are arranged neighboring each other on the peripheral surfaces thereof.

The invention also comprises a torque transmission device such as a hydrodynamic torque converter and/or a torsional vibration damper and/or a wet or dry clutch and/or a double-mass flywheel having a centrifugal pendulum device according to one or more of the embodiments above.

Additional advantages and advantageous embodiments of the invention are found in the description and the drawing, wherein the illustrations thereof are not given with scale accuracy, for reasons of clarity. All explained features can be used not only in the given combination, but also in other combinations and/or individually, without departing from the scope of the invention.

The invention is described in detail below with reference to the drawings, wherein.

DETAILED DESCRIPTION OF THE INVENTION

Figure 1:
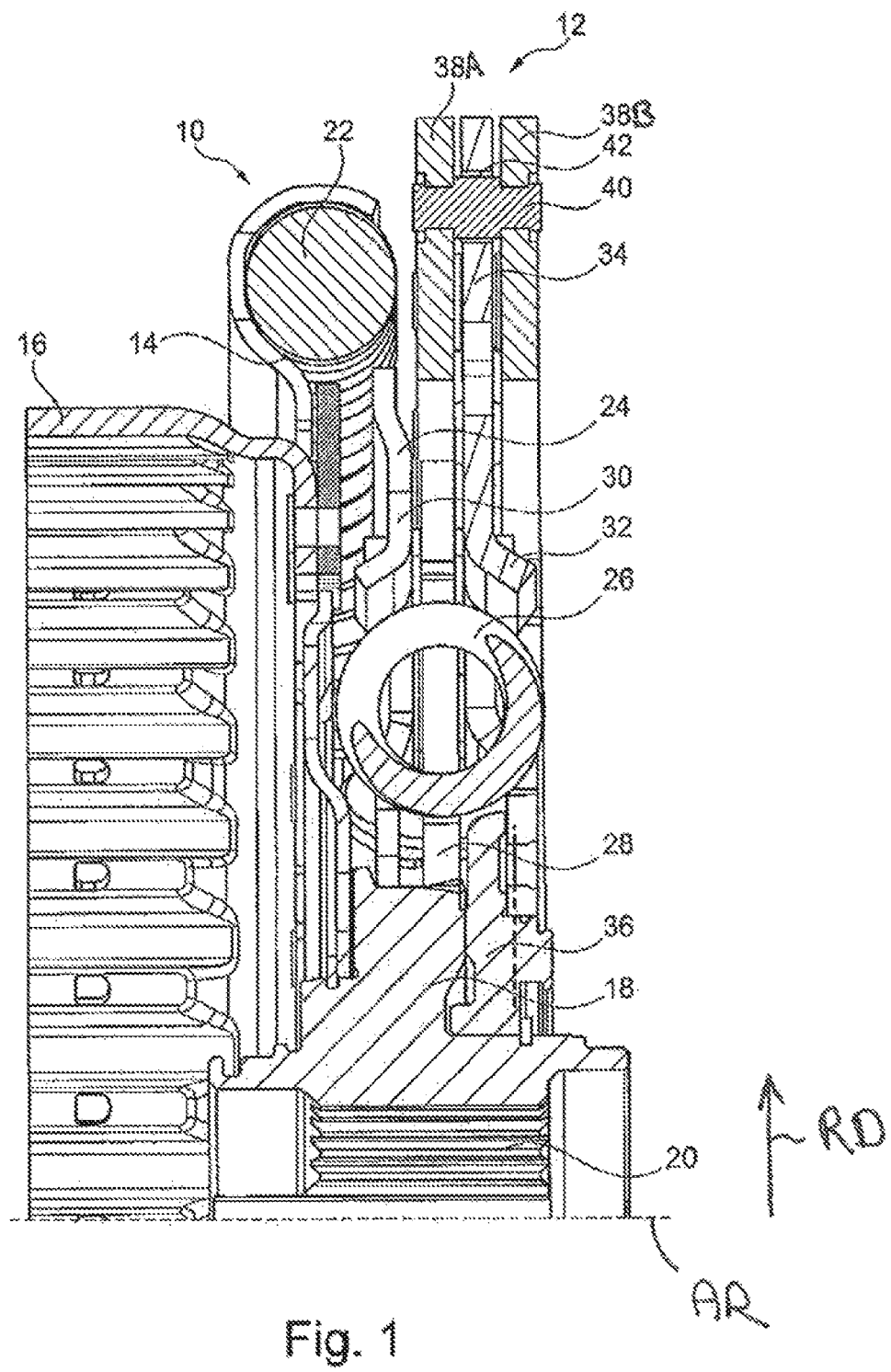
FIG. 1 shows a partial cross-section of a torsional vibration damper with a centrifugal pendulum device according to the prior art.

A partial cross-section view of a torsional vibration damper 10 with a centrifugal pendulum device 12 according to the prior art is shown in FIG. 1. A friction plate carrier 16 is arranged, to function as a clutch output of a clutch device, on the damper input part 14 of the torsional vibration damper 10. The clutch device can be designed, by way of example, as a torque converter lock-up clutch and/or as a wet clutch. The torsional vibration damper 10 in this case is functionally integrated between the clutch output and an output hub 18, wherein the output hub 18 can be connected via a toothing 20 to a transmission input shaft of a transmission in a drive train of a motor vehicle.

The damper input part 14 is centered radially on the inside of the output hub 18, and secured axially, and the outermost peripheral segment thereof encompasses first energy storage elements 22, for example coil springs, which functionally connect the damper input part 14 to an intermediate damper part 24, wherein the intermediate damper part 24 is able to rotate to a limited degree with respect to the damper input part 14. The intermediate damper part 24 is in turn able to rotate to a limited degree with respect to the damper output part 28 via the action of a second set of energy storage elements 26—for example coil springs—which are positioned further inward. The damper output part 28 is fixed to the output hub 18 in a manner preventing rotation, for example via a welded connection.

The intermediate damper part 24 consists of two axially spaced disk parts 30, 32 which axially enclose the damper output part 28 and which are fixed to each other in a manner preventing rotation by means of an attachment means, which is not illustrated here, such as spacer bolts or a spacer rivet. The one disk part 32 in this case is extended radially outward to form a pendulum flange 34. The pendulum flange 34 is an integral component of the disk part 32. The disk part 32 is rotationally fixed inward to a turbine hub 36, and the turbine hub 36 serves to bind and support a turbine wheel of a hydrodynamic torque converter. The turbine hub 36 is centered on the output hub 18 and is arranged so as to be able to rotate with respect to the same.

The pendulum flange 34 accommodates two axially opposed pendulum masses 38 in a segment which is radially further outward, wherein the pendulum masses 38 are connected to each other via a spacer bolt 40 to create a pendulum mass pair, and the spacer bolt 40 engages through a recess 42 in the pendulum flange 34. The spacer bolt 40 is fixed to the pendulum mass 38, for example by riveting, welding, bolting, or caulking.

Figure 2:
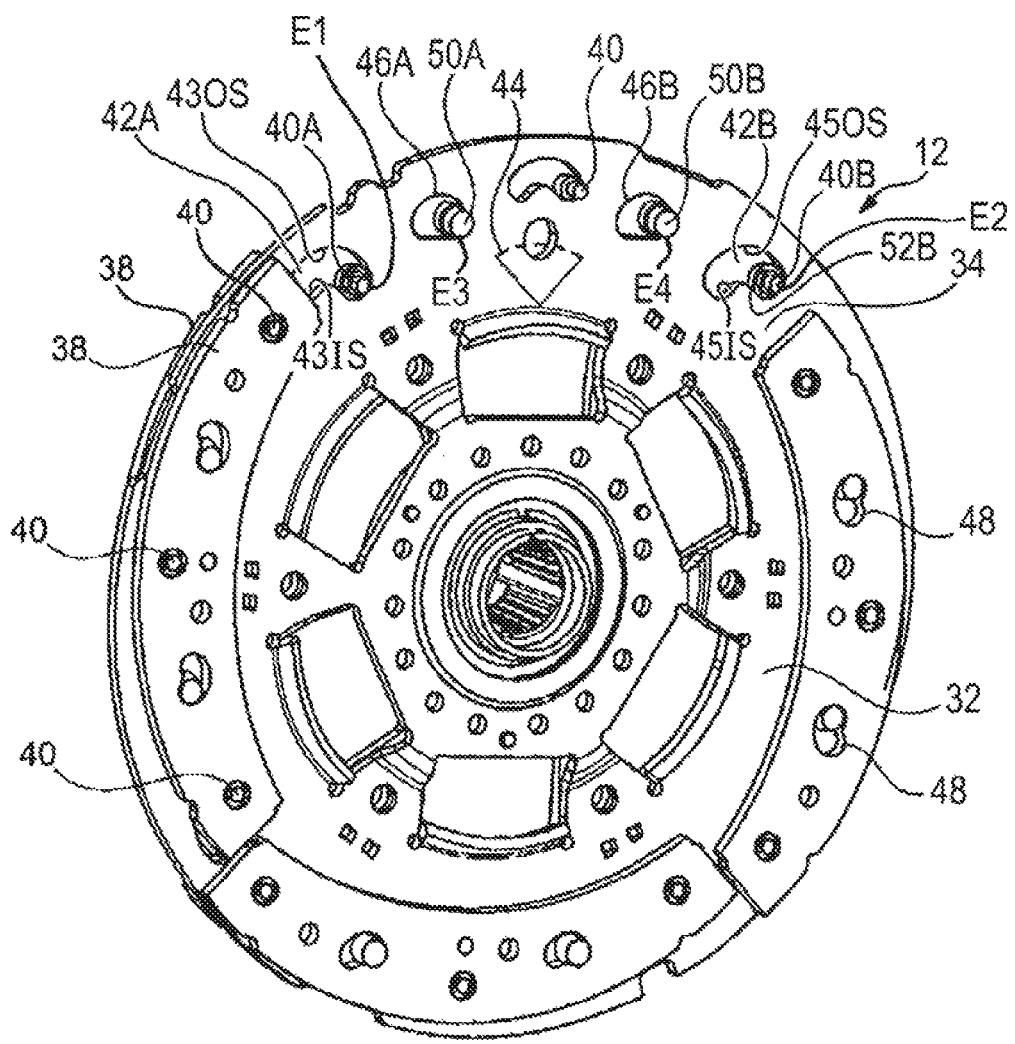
FIG. 2 shows a three-dimensional side view of a centrifugal pendulum device according to the prior art; and, FIG. 3 shows a side view of a cutaway of a centrifugal pendulum device in a special embodiment of the invention.

A three-dimensional side view of a centrifugal pendulum device 12 according to the prior art is illustrated in FIG. 2, wherein the upper pendulum mass in this illustration has been faded out to clarify the region lying below it axially. The centrifugal pendulum device 12 is arranged on the disk part 32 of the intermediate damper part of the torsional vibration damper, wherein the radial extension of the disk part 32 forms the pendulum flange 34 to accommodate the pendulum masses 38 arranged on both sides of the pendulum flange 34, wherein two pendulum masses 38 are arranged on each axial side of the pendulum flange 34, and are connected to each other via a total of three spacer bolts 40, to create a pendulum mass pair. The spacer bolts 40 each engage through recesses 42 in the pendulum flange 34, wherein the recesses 42 are shaped like a kidney such that they allow a pendulum movement of the pendulum masses 38 with respect to the pendulum flange 34, along a defined pendulum track 44. The pendulum track is in turn fixed by the contour of guide tracks 46 in the pendulum masses 38, and complementary guide tracks 48 in the pendulum flange 34, wherein roller elements 50, for example roller bodies, are accommodated in the kidney-shaped guide tracks, and these can roll in the guide tracks 46, 48.

In an axial region of the spacer bolt 40 which engages through the recess 42 in the pendulum flange 38, the spacer bolt 40 is equipped with a damping means 52 in the form of a damping sheath, for the purpose of damping an impact of the spacer bolt 40 on the recess 42. In particular, the damping means 52 consists of an elastic material, for example an elastomer and/or a plastic and/or a rubber and/or a composite material. In this case, the damping means is fixed to the spacer bolt, preferably by a material-, positive-fit, force-fit, or friction-fit connection.

Figure 3:
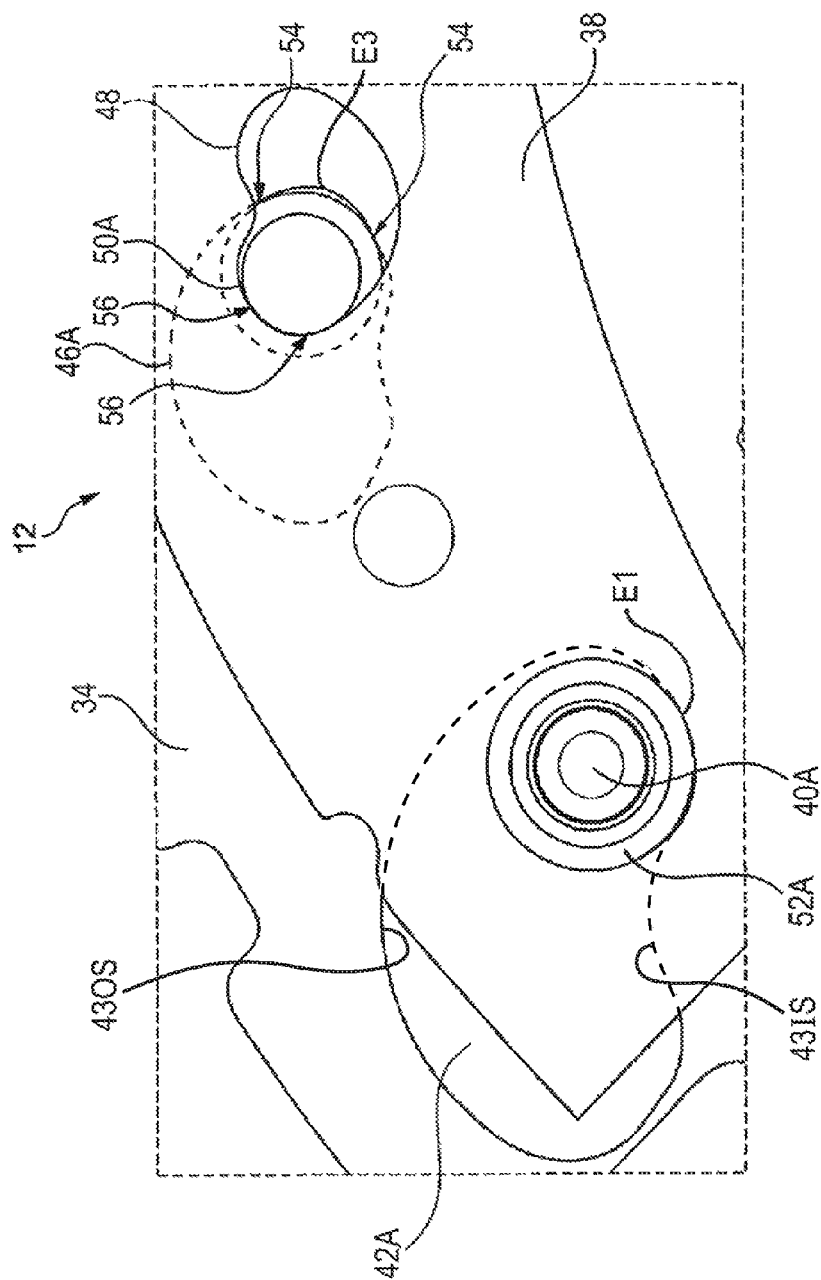

FIG. 3 shows a side view of a recess of a centrifugal pendulum device 12 in a special embodiment of the invention. In this case, the centrifugal pendulum device 12 is illustrated in a position of maximum extension with respect to the pendulum track, wherein the damping means 52 is compressed on the spacer bolt 40. The maximum extension of the pendulum mass 38 with respect to the pendulum flange 34 is limited by the roller element 50 abutting or impacting the respective guide track 46, 48 in the pendulum flange and the pendulum mass, by the roller element coming into contact with the contact surfaces 54 of the guide track 46, and with the contact surfaces 56 of the guide track 48, thereby preventing the damping means 52 from further compressing. In this way, it is possible to prevent an excessive load on the damping means 52. The impact of the roller element 50 on the guide tracks 46, 48 can preferably occur in a damped manner by means of the compression of the damping means 52 on the spacer bolt 40.

The present disclosure includes a method of damping vibration with a centrifugal pendulum device, for example device 12. Although the method is depicted as a sequence of steps for clarity, no order should be inferred from the numbering unless explicitly stated. The centrifugal pendulum device includes: pendulum flange 34, pendulum masses 38A and 38B arranged on first and second sides, respectively of the pendulum flange; spacer bolt 40A fixed to pendulum masses 38A and 38B and passing recess 42A in the pendulum flange; spacer bolt 40B fixed to pendulum masses 38A and 38B and passing recess 42B in the pendulum flange; roller element 50A passing through guide track 46A in the flange and accommodated in respective guide tracks 48 in pendulum masses 38A and 38B; roller element 50B passing through guide track 46B in the flange and accommodated in respective guide tracks 48 in pendulum masses 38A and 38B; damping sheath 52A disposed about spacer bolt 40A; and damping sheath 52B disposed about spacer bolt 40B. Passing recess 42A includes outer radial surface 43OS, inner radial surface 43IS, and end E1. Passing recess 42B includes outer radial surface 45OS, inner radial surface 45IS, and end E2.

A first step pivots pendulum masses 38A and 38B with respect to the pendulum flange. A second step displaces spacer bolts 40A and 40B in the recesses 42A and 42B, respectively. A third step partially compresses damping sheaths 52A and 52B against the pendulum flange. A fourth step rolls roller elements 50A and 50B within guide tracks 46A and 46B, respectively. A fifth step contacts the flange with roller elements 50A and 50B. A sixth step prevents, with the contact between the pendulum flange and roller elements 50A and 50B, further compression of damping sheaths 52A and 52B against the pendulum flange.

In an example embodiment, displacing spacer bolts 40A and 40B in recesses 42A and 42B includes: displacing spacer bolts 40A and 40B closer, in radial direction RD, to axis of rotation AR for the centrifugal pendulum device; and contacting, with damping sheaths 52A and 52B, ends E1 and E2 of recesses 42A and 42B, respectively. In an example embodiment, partially compressing damping sheaths 52A and 52B against the pendulum flange includes less than fully compressing damping sheaths 52A and 52B against the pendulum flange.

In an example embodiment: rolling roller element 50A within guide track 46A includes contacting end E3 of guide track 46A with roller element 50A; and rolling roller element 50B within guide track 46B includes contacting end E4 of guide track 46B with roller element 50B. In an example embodiment: contacting end E1 with damping sheath 52A includes partially compressing damping sheath 52A against end E1; and, contacting end E2 with damping sheath 52B includes partially compressing damping sheath 52B against end E2.

The present disclosure includes a method of damping vibration with a centrifugal pendulum device, for example device 12. Although the method is depicted as a sequence of steps for clarity, no order should be inferred from the numbering unless explicitly stated. The centrifugal pendulum device includes: pendulum flange 34, pendulum masses 38A and 38B arranged on first and second sides, respectively of the pendulum flange; spacer bolt 40A fixed to pendulum masses 38A and 38B and passing recess 42A in the pendulum flange; spacer bolt 40B fixed to pendulum masses 38A and 38B and passing recess 42B in the pendulum flange; roller element 50A passing through guide track 46A in the flange and accommodated in respective guide tracks 48 in pendulum masses 38A and 38B; roller element 50B passing through guide track 46B in the flange and accommodated in respective guide tracks 48 in pendulum masses 38A and 38B; damping sheath 52A disposed about spacer bolt 40A; and damping sheath 52B disposed about spacer bolt 40B.

A first step displaces spacer bolts 40A and 40B, in the recesses 42A and 42B, closer, in radial direction RD, to axis of rotation AR for the centrifugal pendulum device. A second step contacts damping sheaths 52A and 52B with ends E1 and E2. A third step partially compresses damping sheaths 52A and 52B against ends E1 and E2, respectively. A fourth step pivots pendulum masses 38A and 38B with respect to the pendulum flange. A fifth step rolls roller elements 50A and 50B within guide tracks 46A and 46B, respectively. A sixth step contacts the pendulum flange with roller elements 50A and 50B. A seventh step prevents, with the contact between the pendulum flange and roller elements 50A and 50B, full compression of damping sheaths 52A and 52B against the pendulum flange.

In an example embodiment, partially compressing damping sheaths 52A and 52B against the pendulum flange includes less than fully compressing damping sheaths 52A and 52B against the pendulum flange. In an example embodiment: contacting the pendulum flange with roller elements 50A and 50B includes: contacting end E3 with roller element 50A; and contacting end E4 with roller element 50B.

The present disclosure includes a method of damping vibration with a centrifugal pendulum device, for example device 12. Although the method is depicted as a sequence of steps for clarity, no order should be inferred from the numbering unless explicitly stated. The centrifugal pendulum device includes: pendulum flange 34, pendulum masses 38A and 38B arranged on first and second sides, respectively of the pendulum flange; spacer bolt 40A fixed to pendulum masses 38A and 38B and passing recess 42A in the pendulum flange; spacer bolt 40B fixed to pendulum masses 38A and 38B and passing recess 42B in the pendulum flange; roller element 50A passing through guide track 46A in the flange and accommodated in respective guide tracks 48 in pendulum masses 38A and 38B; roller element 50B passing through guide track 46B in the flange and accommodated in respective guide tracks 48 in pendulum masses 38A and 38B; damping sheath 52A disposed about spacer bolt 40A; and damping sheath 52B disposed about spacer bolt 40B.

A first step displaces spacer bolts 40A and 40B in recesses 42A and 42B. A second step contacts damping sheaths 52A and 52B with ends E1 and E2, respectively. A third step less than fully compresses damping sheaths 52A and 52B against ends E1 and E2, respectively. A fourth step pivots pendulum masses 38A and 38B with respect to the pendulum flange. A fifth step rolls roller elements 50A and 50B within guide tracks 46A and 46B, respectively. A sixth step contacts roller element 50A with end E3. A seventh step contacts roller element 50B with end E4. A seventh step prevents, with the contact between the pendulum flange and roller elements 50A and 50B, further compression of damping sheaths 52A and 52B against the pendulum flange.

In an example embodiment, a sixth step displaces spacer bolts 40A and 40B in recesses 42A and 42B such that spacer bolts 40A and 40B are closer, in radial direction RD, to an axis of rotation AR.

LIST OF REFERENCE NUMERALS 10 torsional vibration damper
12 centrifugal pendulum device
14 damper input part
16 friction plate carrier
18 output hub
20 toothing
22 energy storage element
24 intermediate damper part
26 energy storage element
28 damper output part
30 disk part
32 disk part
34 pendulum flange
36 turbine hub
38 pendulum mass
38A pendulum mass
38B pendulum mass
40 spacer bolt
40A spacer bolt
40B spacer bolt
42 recess
42A passing recess
42B passing recess
430S outer radial surface
431S inner radial surface
44 pendulum track
450S outer radial surface
451S inner radial surface
46 guide track
46A guide track
46B guide track
48 guide track
50 roller element
50A roller element
50B roller element
52 damping means
52A damping sheath
52B damping sheath
54 contact surface
56 contact surface
E1 end
E2 end
E3 end
E4 end

What is claimed is:

1. A method of damping vibration with a centrifugal pendulum device including a pendulum flange, a first pendulum mass and a second pendulum mass arranged on a first side and a second side of the pendulum flange, respectively, a first spacer bolt and a second spacer bolt fixed to the first and second pendulum masses, respectively, and passing through a first recess and a second recess in the pendulum flange, respectively, a first roller element passing through a first guide track in the flange and accommodated in a second guide track and a third guide track in the first and second pendulum masses, respectively, a second roller element passing through a fourth guide track in the flange and accommodated in a fifth guide track and a sixth guide track in the first and second pendulum masses, respectively, a first damping sheath disposed about the first spacer bolt, and a second damping sheath disposed about the second spacer bolt, the method comprising:

pivoting the first and second pendulum masses with respect to the pendulum flange;

displacing the first spacer bolt and the second spacer bolt in the first and second recesses, respectively;

partially compressing the first and second damping sheaths against the pendulum flange;

rolling the first and second roller elements within the first and fourth guide tracks, respectively;

contacting the flange with the first and second roller elements; and, preventing, with the contact between the pendulum flange and the first and second roller elements, further compression of the first and second damping sheaths against the pendulum flange.

2. The method of claim 1, wherein displacing the first and second spacer bolts in the first and second recesses includes:

displacing the first and second spacer bolts closer, in a radial direction, to an axis of rotation for the centrifugal pendulum device; and, contacting, with the first and second damping sheaths, first and second ends of the first and second recesses, respectively.

3. The method of claim 1, wherein partially compressing the first and second damping sheaths against the pendulum flange includes less than fully compressing the first and second damping sheaths against the pendulum flange.

4. The method of claim 1, wherein:

rolling the first roller element within the first guide tracks includes contacting a first end of the first guide track with the first roller element; and, rolling the second roller element within the fourth guide track includes contacting a second end of the fourth guide track with the second roller element.

5. The method of claim 4, wherein:

contacting the first end of the first guide track with the first damping sheath includes partially compressing the first damping sheath against the first end; and, contacting the second end of the fourth guide track with the second damping sheath includes partially compressing the second damping sheath against the second end.

6. A method of damping vibration with a centrifugal pendulum device including a pendulum flange, a first pendulum mass and a second pendulum mass arranged on a first side and a second side of the pendulum flange, respectively, a first spacer bolt and a second spacer bolt fixed to the first and second pendulum masses, respectively, and passing through a first recess and a second recess in the pendulum flange, respectively, a first roller element passing through a first guide track in the flange and accommodated in a second guide track and a third guide track in the first and second pendulum masses, respectively, a second roller element passing through a fourth guide track in the flange and accommodated in a fifth guide track and a sixth guide track in the first and second pendulum masses, respectively, a first damping sheath disposed about the first spacer bolt, and a second damping sheath disposed about the second spacer bolt, the method comprising:

displacing the first spacer bolt and the second spacer bolt in the first and second recesses, respectively, closer, in a radial direction, to an axis of rotation for the centrifugal pendulum device;

contacting the first and second damping sheaths with first and second ends of the first and second recesses, respectively;

partially compressing the first and second damping sheaths against first and second ends of the first and second recesses, respectively;

pivoting the first and second pendulum masses with respect to the pendulum flange;

rolling the first and second roller elements within the first and second guide tracks, respectively;

contacting the pendulum flange with the first and second roller elements; and, preventing, with the contact between the pendulum flange and the first and second roller elements, full compression of the first and second damping sheaths against the pendulum flange.

7. The method of claim 6, wherein partially compressing the first and second damping sheaths against the pendulum flange includes less than fully compressing the first and second damping sheaths against the pendulum flange.

8. The method of claim 6, wherein contacting the pendulum flange with the first and second roller elements includes:

contacting a third end of the first guide track with the first roller element; and, contacting a fourth end of the fourth guide track with the second roller element.

9. A method of damping vibration with a centrifugal pendulum device including a pendulum flange, a first pendulum mass and a second pendulum mass arranged on a first side and a second side of the pendulum flange, respectively, a first spacer bolt and a second spacer bolt fixed to the first and second pendulum masses, respectively, and passing through a first recess and a second recess in the pendulum flange, respectively, wherein the first recess includes a first inner radial surface and a first outer radial surface and the second recess includes a second inner radial surface and a second outer radial surface, a first roller element passing through a first guide track in the flange and accommodated in a second guide track and a third guide track in the first and second pendulum masses, respectively, a second roller element passing through a fourth guide track in the flange and accommodated in a fifth guide track and a sixth guide track in the first and second pendulum masses, respectively, a first damping sheath disposed about the first spacer bolt, and a second damping sheath disposed about the second spacer bolt, the method comprising:

displacing the first spacer bolt along the first inner and outer radial surfaces and the second spacer bolt along the second inner and outer radial surfaces;

contacting the first and second damping sheaths with first and second ends of the first and second recesses, respectively;

less than fully compressing the first and second damping sheaths against the first and second ends, respectively;

pivoting the first and second pendulum masses with respect to the pendulum flange;

rolling the first and second roller elements within the first and second guide tracks, respectively;

contacting the first roller element with a third end of the first guide track;

contacting the second roller element with a fourth end of the second guide track; and, preventing, with the contact between the pendulum flange and the first and second roller elements, further compression of the first and second damping sheaths against the pendulum flange.

10. The method of claim 9, further comprising:
displacing the first and second spacer bolts in the first and second recesses such that the first and second spacer bolts are closer, in a radial direction, to an axis of rotation for the centrifugal pendulum device.

* * * * *